United States Patent
Kelly et al.

(10) Patent No.: US 9,137,980 B2
(45) Date of Patent: Sep. 22, 2015

(54) MODULAR FISHING LURE ORGANIZATION AND STORAGE CONTAINER SYSTEM

(71) Applicants: Joshua Kelly, Asheville, NC (US); Erik White, Asheville, NC (US)

(72) Inventors: Joshua Kelly, Asheville, NC (US); Erik White, Asheville, NC (US)

( * ) Notice: Subject to any disclaimer, the term of this patent is extended or adjusted under 35 U.S.C. 154(b) by 116 days.

(21) Appl. No.: 14/090,788

(22) Filed: Nov. 26, 2013

(65) Prior Publication Data

US 2015/0143740 A1    May 28, 2015

(51) Int. Cl.
*A01K 97/00*    (2006.01)
*A01K 97/06*    (2006.01)
*B65D 21/028*   (2006.01)
B65D 21/02      (2006.01)

(52) U.S. Cl.
CPC ............ *A01K 97/06* (2013.01); *B65D 21/0201* (2013.01)

(58) Field of Classification Search
CPC ... A01K 97/00; A01K 97/06; B65D 21/0201; B65D 21/0202
USPC .......................... 43/4, 54.1, 55; 220/23.2, 23.4
See application file for complete search history.

(56) References Cited

U.S. PATENT DOCUMENTS

| | | | |
|---|---|---|---|
| 4,006,553 A * | 2/1977 | Porter et al. .................. 43/54.1 |
| 4,589,546 A * | 5/1986 | Sunderland ............. 206/315.11 |
| 4,631,856 A * | 12/1986 | Born ................................ 43/57.1 |
| 4,770,327 A * | 9/1988 | Fortson ........................ 224/485 |
| 4,827,658 A | 5/1989 | Wolniak |
| 4,958,730 A * | 9/1990 | Bunten .................... 206/315.11 |
| 5,050,755 A * | 9/1991 | Strawder ...................... 220/23.4 |
| 5,167,336 A * | 12/1992 | Lajovic ........................ 220/23.6 |
| 5,228,232 A * | 7/1993 | Miles .............................. 43/57.1 |
| 5,381,916 A * | 1/1995 | Strawder ...................... 220/23.4 |
| 5,960,582 A * | 10/1999 | Wilkins ......................... 43/54.1 |
| 6,050,657 A * | 4/2000 | Hiltzman ....................... 312/111 |
| 6,694,668 B2 * | 2/2004 | Barnett, Jr. .................... 43/57.1 |
| 7,506,778 B2 * | 3/2009 | DaSilva et al. .............. 220/23.4 |
| 2002/0079313 A1 * | 6/2002 | Grayson ..................... 220/23.4 |
| 2005/0097807 A1 | 5/2005 | Hoover |

FOREIGN PATENT DOCUMENTS

EP    1762143 A1    3/2007

* cited by examiner

Primary Examiner — Christopher P Ellis
Assistant Examiner — Michael Wang
(74) Attorney, Agent, or Firm — McGarry Bair PC

(57) ABSTRACT

A fishing lure and leader may reside in a modular fishing lure organization and storage container receptacle characterized by a chamber having a pair of parallel spaced-apart planar sidewalls, a pair of parallel spaced-apart outwardly concave channel walls connecting the planar sidewalls, and a receptacle saddle connecting the sidewalls and the channel walls. A closure is closeable over a chamber opening. A slot divides a concave channel wall, and extends from the chamber opening into the receptacle saddle. A fishing lure may be placed in the receptacle, and a leader attached to a fishing lure is insertable through the slot. The closure may be closed over the chamber opening, and the leader may be wrapped along the concave channel walls and over the receptacle saddle and the closure.

20 Claims, 17 Drawing Sheets

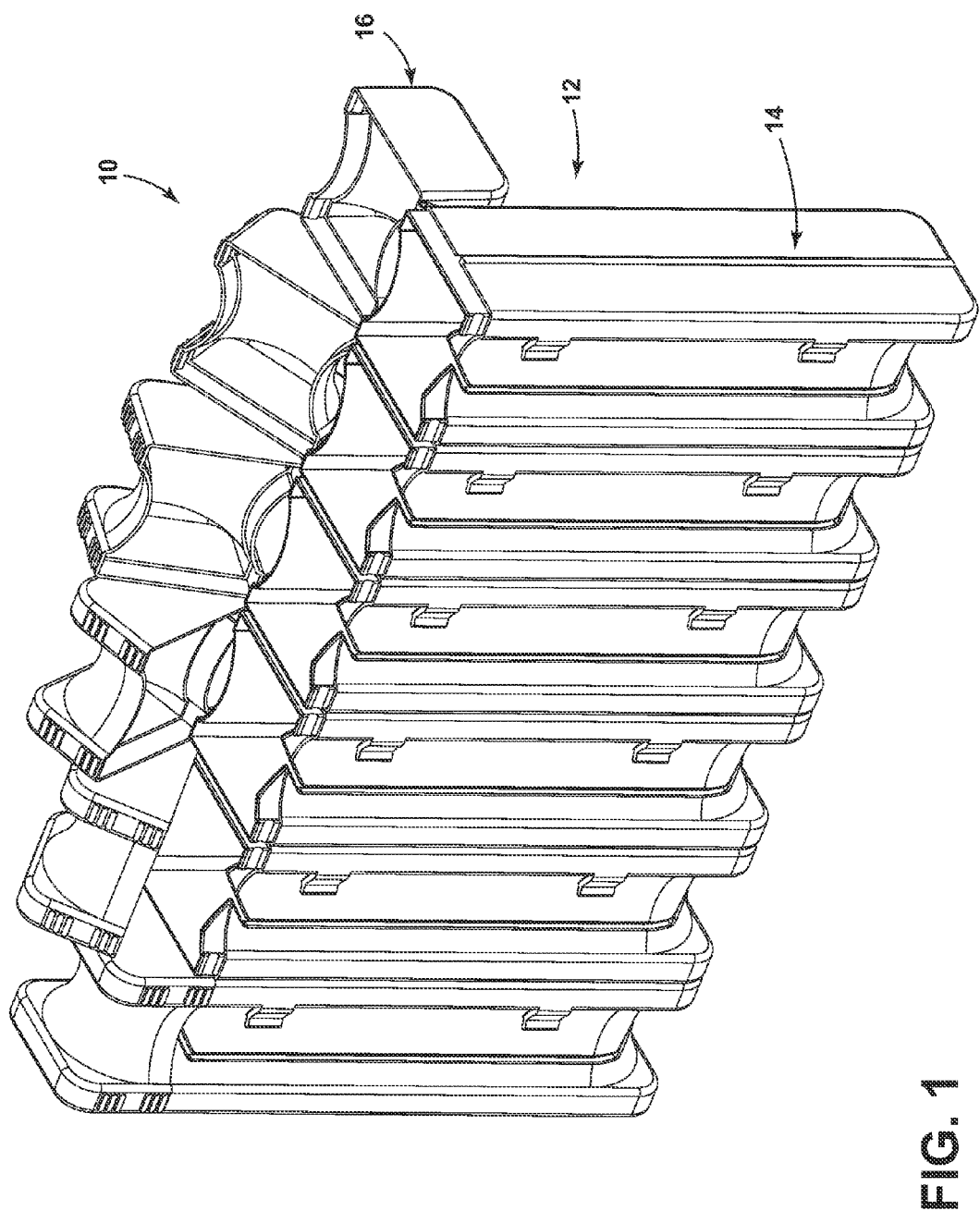

MODULAR FISHING LURE ORGANIZATION AND STORAGE CONTAINER SYSTEM

BACKGROUND OF THE INVENTION

The invention relates to a modular organization and storage system comprising one or more coupled fishing lure containers for minimizing the potential for entanglement of lures and for facilitating the selection and use of specific lures.

Anglers from river to sea may use a variety of lures, flies, and rigs, i.e. "tackle," that have a predetermined length of attached "leader." A "leader" is a length of line attached to the lure that may differ from the main line, and may vary in thickness and material depending on the targeted species and conditions. Some lure and fly designs may comprise a hook attached to a length of leader over which the lure or fly slides. Both the lure and the attached leader may require protection in an organized manner while not in use, but storage of the aforementioned tackle may be difficult. Failure to employ suitable storage may result in tangling, snagging, and resulting damage to the lure, leader, and potentially the angler.

It may be necessary several times during an outing to change from one lure and leader to another in response to changes in fishing conditions. In such a case, the replacement lure must be located. Spending time searching among numerous unorganized lures and other angling accessories may consume time otherwise spent fishing. Haphazard storage of lures and leaders may contribute to entanglement, resulting in a tightly interconnected grouping that may be difficult to quickly separate, or separate at all, resulting in lost fishing time.

If a leader is to be tied to the lure before attaching the lure to the main line, the angler may spend precious time during an active feeding event in selecting the lure, selecting the leader, cutting the leader to a selected length, tying the lure to the leader, and attaching the leader to the main line, all consuming the time available for active fishing. Consequently, it may be desirable for the angler to locate and retrieve the desired lure and leader, and store the previously used lure and leader, as quickly and efficiently as possible. Effective organization and storage of fishing lures with attached leaders that protects both the lure and the leader, while enabling their rapid storage and retrieval during an outing, may not be satisfactorily provided by known apparatuses or methods.

BRIEF SUMMARY OF THE INVENTION

A fishing lure and leader may reside in a modular fishing lure organization and storage container receptacle characterized by a chamber having a pair of parallel spaced-apart planar sidewalls, a pair of parallel spaced-apart outwardly concave channel walls connecting the planar sidewalls, and a receptacle saddle connecting the sidewalls and the channel walls. A closure is closeable over a chamber opening. A slot divides a concave channel wall, and extends from the chamber opening into the receptacle saddle. A fishing lure may be placed in the receptacle, and a leader attached to a fishing lure is insertable through the slot. The closure may be closed over the chamber opening, and the leader may be wrapped along the concave channel walls and over the bottom wall and the closure.

BRIEF DESCRIPTION OF THE SEVERAL VIEWS OF THE DRAWINGS

In the drawings:

FIG. 1 is a perspective view of a plurality of interconnected modular fishing lure organization and storage containers according to an embodiment of the invention.

DETAILED DESCRIPTION OF THE INVENTION

Figure 2A:
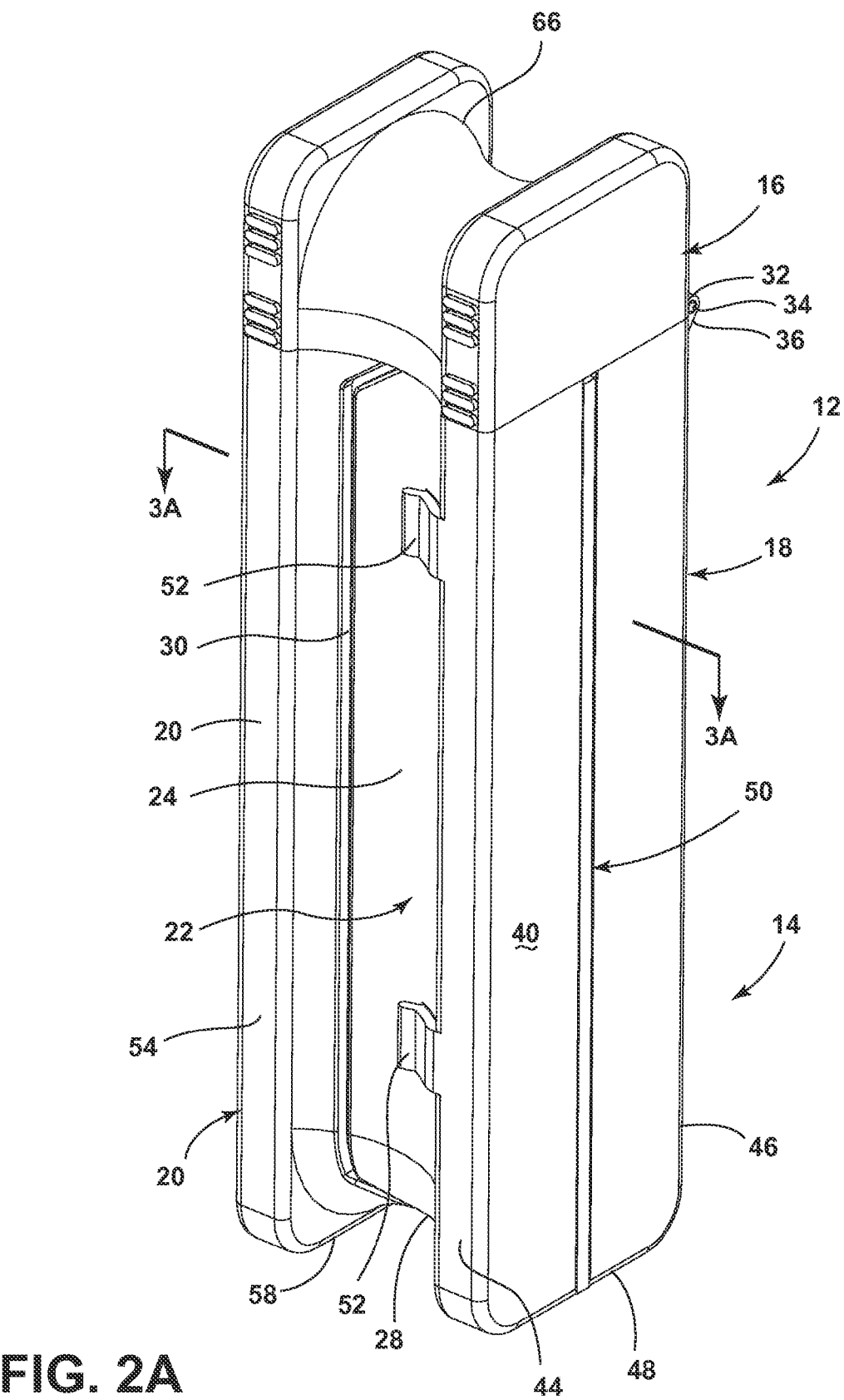
FIG. 2A is a perspective view of a modular fishing lure organization and storage container illustrated in FIG. 1 with a pivotable closure and lure receptacle according to a second embodiment of the invention.

Several different exemplary embodiments of a modular fishing lure container system according to the invention are described and illustrated hereinafter. The exemplary embodiments may be described and illustrated with reference to lures, i.e. "fishing flies," utilized in fly-rodding. Nevertheless, it should be understood that the modular fishing lure container system may be utilized for a variety of lures, as defined below, and should not be considered limited to fly-rodding or fishing flies.

"Box" as used herein may be defined as "an enclosure, protective case, container, housing, and the like, either with or without a closing lid, into which an item may be placed."

"Lure" as used herein may be defined as "a decoy, including fishing flies, spinners, spoons, plugs, and the like, comprising a sharp fishing hook attachable to a fishing line or leader, representative of an aquatic food source and used by sport fisherman for attracting or enticing a fish into striking or devouring the decoy." "Lure" may also include live bait, such as worms, minnows, insects, and the like, or a replica thereof, attached to a hook.

"Leader" as used herein may be defined as "a length of nylon line, gut, wire, string, and the like, to which a fishing lure or hook is attachable, and which is attachable to a fishing line."

Referring now to the drawings, and particularly to FIG. 1, a modular fishing lure organization and storage container system (hereinafter "container system") 10 according to an embodiment of the invention is illustrated. The container system 10 may comprise a plurality of modular fishing lure boxes or containers 12, each defining a longitudinal axis 13, and comprising a lure receptacle 14 pivotably coupled with a closure 16 for closing off an interior space 38 of the lure receptacle 14.

The modular fishing lure containers 12 may be fabricated of a material having suitable strength, resiliency, durability, resistance to deterioration, and the like, for the purposes described herein. A suitable material may be a plastic. Modular fishing lure containers 12 may comprise transparent or translucent materials to enable ready identification of lures retained therein. Modular fishing lure containers 12 may be colored, or may incorporate ornamentation, to facilitate differentiation of selected lures or types of lures. Modular fishing lure containers 12 may be fabricated so that the lure receptacle 14 has a smooth interior for ease in inserting and removing a lure, and minimizing snagging and damage.

FIG. 1 illustrates six exemplary coupled modular fishing lure containers 12, showing each closure 16 progressively transitioning (left to right) from completely closed to completely open. The containers 12 can be attached sidewall-to-sidewall through a container coupler, described and illustrated in greater detail hereinafter.

It may be noted that several embodiments of the invention may be described and illustrated herein and such embodiments may share certain features and/or functionalities. Once described, such shared features and/or functionalities may not subsequently be described herein except as necessary for a complete understanding of the invention. Furthermore, the embodiments disclosed herein may comprise different combinations of features and functionalities, and such embodiments may be considered exemplary. The embodiments are not intended to be construed in any way as limiting on the scope of the claims. Other combinations of features and functionalities may be evident to a person of ordinary skill in the relevant art, and the absence of any description of such a combination is not intended to be construed in any way as limiting on the scope of the claims.

Figure 2B:
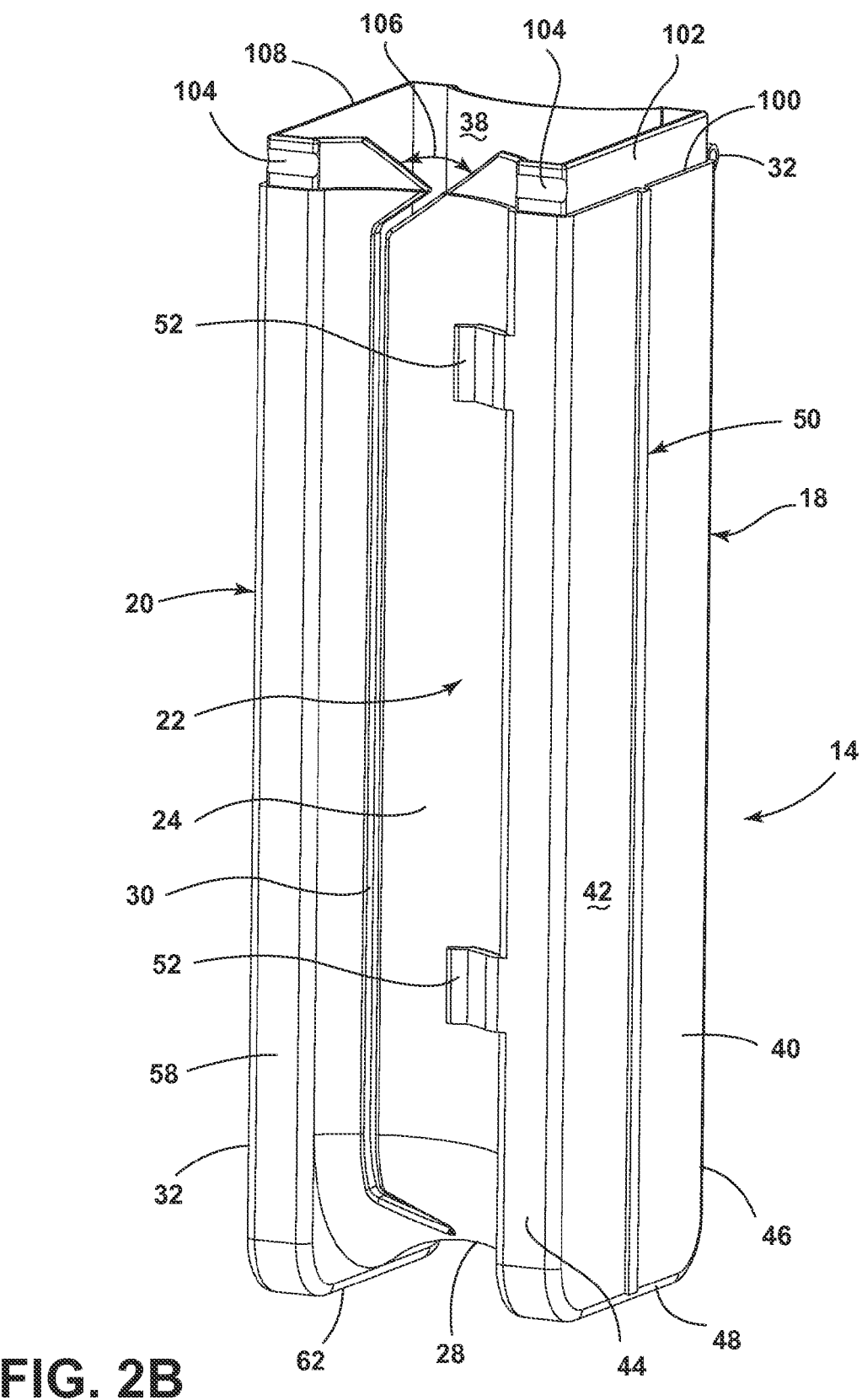
FIG. 2B is a first perspective view of the modular fishing lure organization and storage container illustrated in FIG. 2A with the pivotable closure removed.

Referring now to FIGS. 2A and 2B, the lure receptacle 14 may be a bilaterally symmetrical hollow elongate body characterized by a first sidewall structure 18, an opposed second sidewall structure 20, and an intervening elongate U-shaped leader channel 22. The first sidewall structure 18 may comprise a sidewall 40, characterized by a generally planar surface 42, transitioning orthogonally to an obverse wall 44, a reverse wall 46, and a bottom wall 48 extending perimetrically along three edges of the sidewall 40. The second sidewall structure 20 may comprise a sidewall 54, characterized by a generally planar surface 56, transitioning orthogonally to an obverse wall 58, a reverse wall 60, and a bottom wall 62 extending perimetrically along three edges of the sidewall 54. The first sidewall 40 and second sidewall 54 may be disposed in a parallel orientation.

The U-shaped leader channel 22 may comprise a channel obverse wall 24, a channel reverse wall 26, and a receptacle saddle 28 having a receptacle saddle surface 29, and may connect the sidewall structures 18, 20. The channel obverse wall 24 and channel reverse wall 26 may each be characterized by a shallow concave cross-section extending between the sidewalls 48, 54. The receptacle saddle 28 may transition between the channel obverse wall 24 and the channel reverse wall 26, and between the sidewalls 40, 54, to define a surface generally configured as a hyperbolic paraboloid. A pair of opposed curved container saddle transition lines 98 may define the intersection of the receptacle saddle 28 with the sidewall structures 18, 20.

Figure 5:
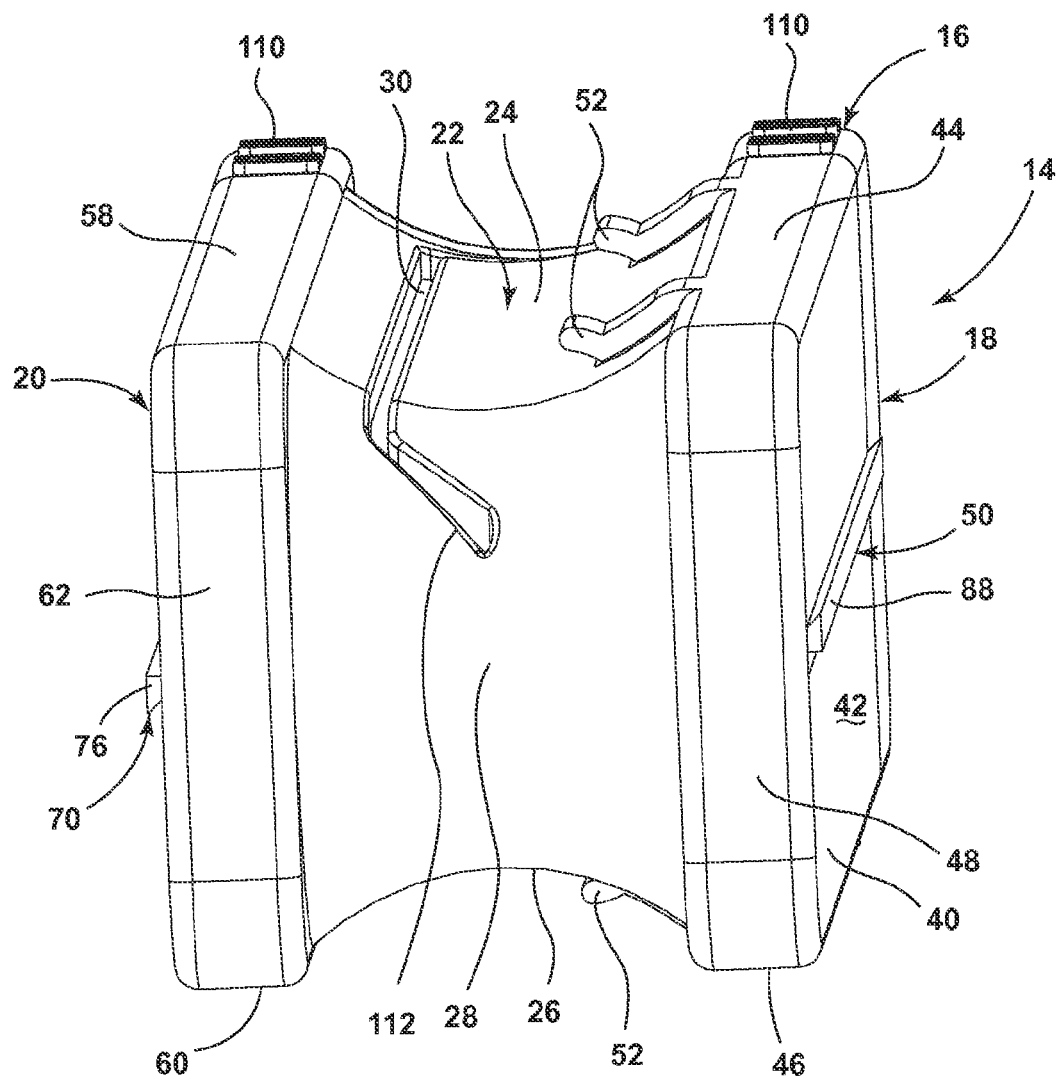
FIG. 5 is a third perspective view of the modular fishing lure organization and storage container illustrated in FIG. 2B.

The first sidewall structure 18, second sidewall structure 20, and leader channel 22 may define the interior space 38, which may comprise a lure chamber, accessible through a chamber opening 39. The channel obverse wall 24 may be divided longitudinally by a narrow leader slot 30 extending through the channel obverse wall 24 to the interior space 38. Referring also to FIG. 5, the leader slot 30 may be offset somewhat from a longitudinal centerline of the channel obverse wall 24 toward the second sidewall structure 20. Upon extending into the receptacle saddle 28, the leader slot 30 may transition toward the longitudinal axis 13 to a slot tail 112, which may be selectively linear or curved. As illustrated in FIGS. 2A and 2B, the leader slot 30 may transition angularly toward the chamber opening 39.

The planar surface 42 of the sidewall 40 and the planar surface 56 of the sidewall 54 may comprise a first exemplary embodiment of a container coupler 50. One planar surface, for example the planar surface 42, may comprise a tongue and groove coupler 51. The opposite planar surface, for example the planar surface 56, may comprise a counterpart tongue and groove coupler 70. This may enable coupling of a pair of modular fishing lure containers 12 by complementary engagement of the tongue and groove coupler 51 of one modular fishing lure container 12 with the tongue and groove coupler 70 of another modular fishing lure container 12. It may be noted that the tongue and groove couplers 51, 70 are associated only with the sidewalls 40, 54, and do not extend along the closure 16.

Figure 3A:
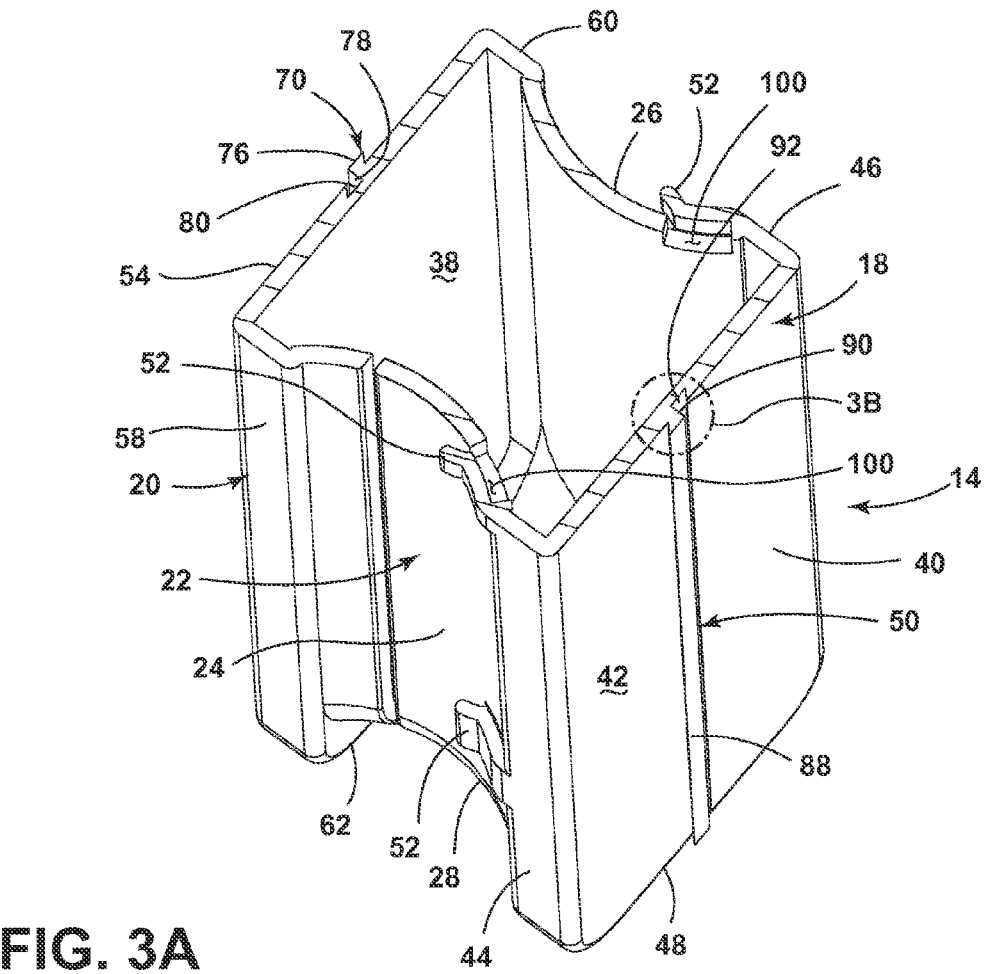
FIG. 3A is a perspective section view along view line 3A-3A of FIG. 2A.
Figure 3B:
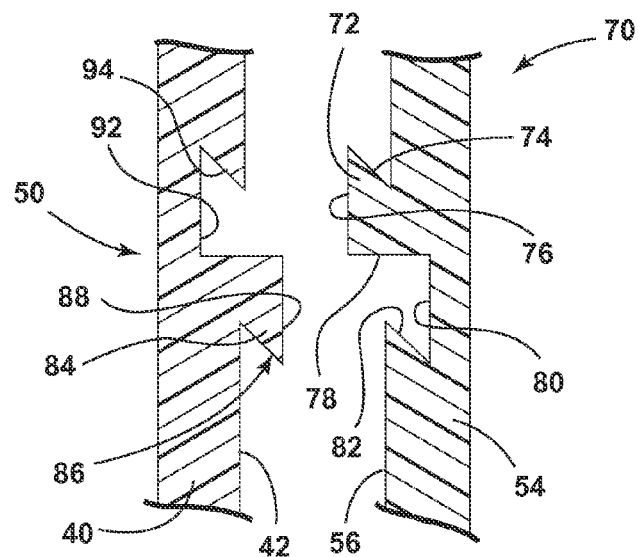
FIG. 3B is an enlarged section view of a portion of the modular fishing lure organization and storage container illustrated in FIG. 3A.

Turning to FIGS. 3A and 3B, the tongue and groove coupler 51 may extend longitudinally along the first sidewall 40 and may comprise a partially triangular tongue 84 and a partially triangular groove 85. The partially triangular tongue 84 may be characterized by a tongue inclined wall 86 angling acutely away from the first sidewall surface 42, transitioning to a tongue outer wall 88 parallel to the first sidewall surface 42, in turn transitioning to a tongue orthogonal wall 90 extending into the interior of the first sidewall 40 perpendicular to the first sidewall surface 42. The partially triangular groove 85 may be characterized by a groove inner wall 92 disposed parallel to the tongue outer wall 88, and transitioning away from the tongue orthogonal wall 90. The groove inner wall 92 may, in turn, transition to a groove inclined wall 94 angling acutely away from the groove inner wall 92 for acute interception by the first sidewall surface 42.

Similarly, the tongue and groove coupler 70 may extend longitudinally along the second sidewall 54 and may comprise a partially triangular tongue 72 and a partially triangular groove 73. The partially triangular tongue 72 may be characterized by a tongue inclined wall 74 angling acutely away from the second sidewall surface 56, transitioning to a tongue outer wall 76 parallel to the second sidewall surface 56, in turn transitioning to a tongue orthogonal wall 78 extending into the interior of the second sidewall 54 perpendicular to the second sidewall surface 56. The partially triangular groove 73 may be characterized by a groove inner wall 80 disposed parallel to the tongue outer wall 76, and transitioning away from the tongue orthogonal wall 78. The groove inner wall 80 may, in turn, transition to a groove inclined wall 82 angling acutely away from the groove inner wall 80 for acute interception by the second sidewall surface 56.

The cross-sectional configuration of the partially triangular tongue 84 may be complementary with the cross-sectional configuration of the partially triangular groove 73 so that the tongue 84 may be slidably received in the groove 73. Similarly, the cross-sectional configuration of the partially triangular tongue 72 may be complementary with the cross-sectional configuration of the partially triangular groove 85. The partially triangular tongue 84 and partially triangular groove 73 of a first pair of lure receptacles 14 may be configured so that the sidewall surfaces 42, 56 may be in intimate slidable contact. Similarly, the partially triangular tongue 72 of one of the first pair of lure receptacles 14, and the partially triangular groove 85 of a third lure receptacle 14 may be configured so that the sidewall surfaces 42, 56 of the second pair of lure receptacles 14 may be in intimate slidable contact. Thus, three lure receptacles 14 may be coupled together side-by-side into a unified container system. The grooves 73, 85 may terminate in end walls (not shown) parallel to and adjacent the bottom walls 48, 62, which the tongues 72, 84 may contact to limit slidable translation of one lure receptacle 14 relative to another. The end walls, grooves, and tongues may be configured so that the coupled lure receptacles 14 are symmetrically disposed.

Any selected number of lure receptacles 14, e.g. 4, 7, 12, etc., may be coupled together depending upon factors dictating the number and types of lures needed, such as the fish species that may be caught, anticipated weather conditions, fishing locations that may be visited, and the like. Alternatively, the lure receptacles 14 may be carried and utilized individually.

Figure 4:
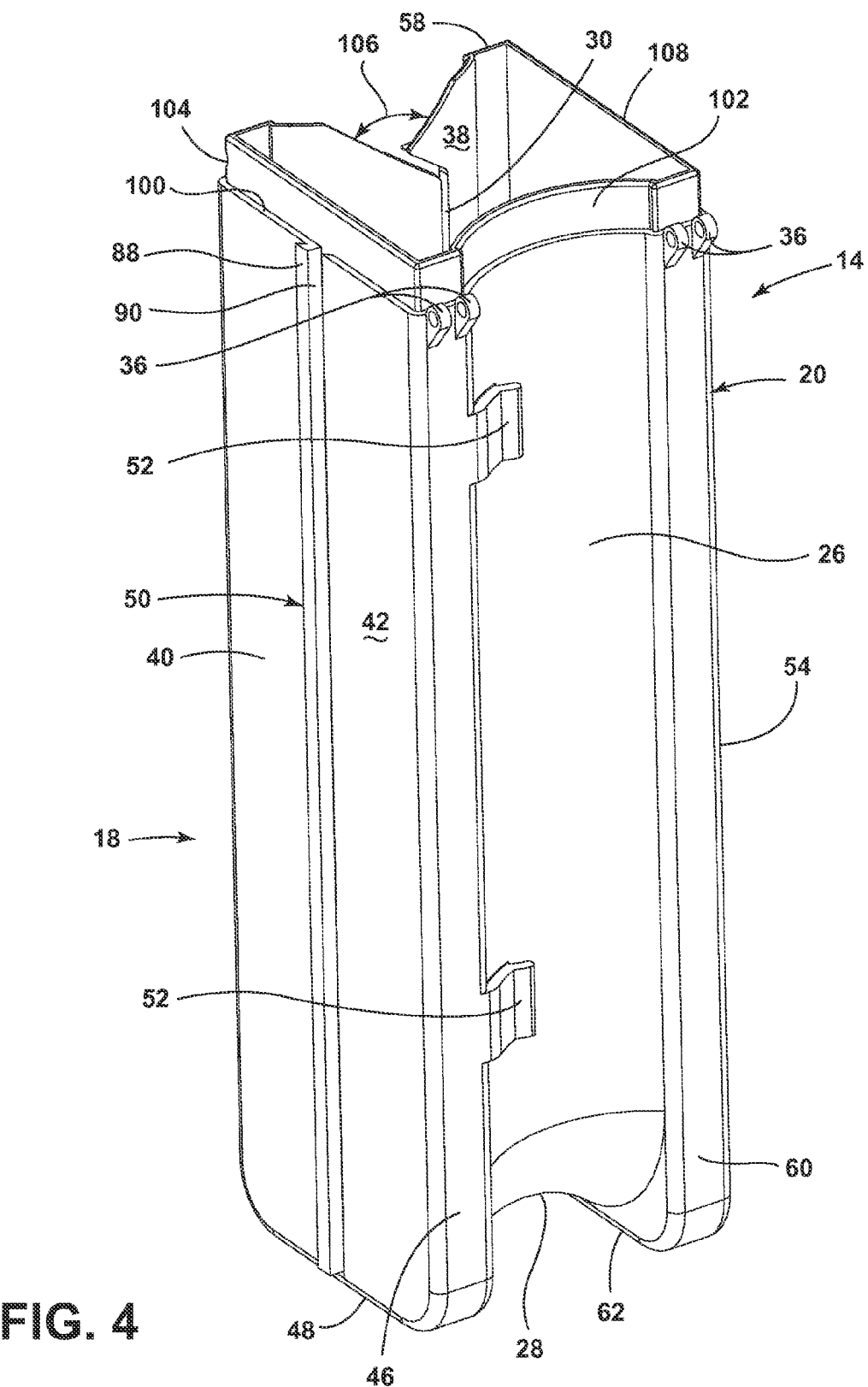
FIG. 4 is a second perspective view of the modular fishing lure organization and storage container illustrated in FIG. 2B.

Referring again to FIG. 2B, and to FIG. 4, the lure receptacle 14 may terminate at the chamber opening 39 in a structure for optimizing the functionality of the closure 16. The sidewall structures 18, 20, channel obverse wall 24, and channel reverse wall 26, may transition inwardly to a perimetric shoulder 100 defining a plane perpendicular to the longitudinal axis 13. A perimetric wall 102 may extend orthogonally away from the perimetric shoulder 100, terminating in a perimetric edge 108 also defining a plane perpendicular to the longitudinal axis 13. Adjacent the first and second obverse walls 44, 58, the perimetric wall 102 may transition to a pair of closure catches 104, the purposes of which will be described hereinafter.

Associated with the channel obverse wall 24, the perimetric edge 108 may transition to a pair of opposed counterpart inclines defining a V-shaped notch 106 midway between the obverse walls 44, 58. The vertex of the V-shaped notch may intercept the perimetric shoulder 100 and transition to the leader slot 30. Adjacent the perimetric shoulder 100, the first and second reverse walls 46, 60 may each terminate in a parallel spaced-apart pillow block 36 comprising part of a hinge 32 for pivotable coupling of the lure receptacle 14 with the closure 16.

The first obverse wall 44 and first reverse wall 46 may transition inwardly at selected locations to a plurality of longitudinally-spaced flexible leader hold-downs 52. As illustrated in FIG. 3A, each leader hold-down 52 may be associated with a generally rectangular hold-down slot 64 penetrating the channel obverse wall 24, or channel reverse wall 26. The leader hold-down 52 may be an angled cantilevered flat spring terminating in a somewhat outwardly disposed hold-down finger 53. A portion of the leader hold-down 52 may be adapted for receipt in an associated hold-down slot 64 when the leader hold-down 52 may be in a relaxed configuration.

Figure 6A:
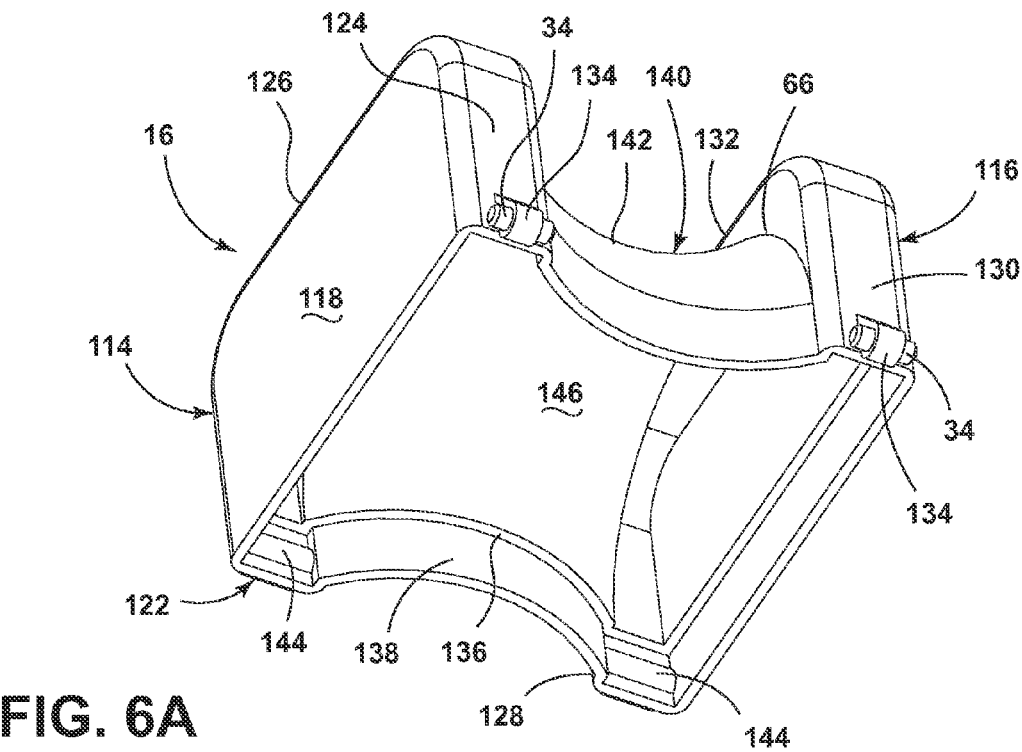
FIG. 6A is a first perspective view of the pivotable closure illustrated in FIG. 2A.
Figure 6B:
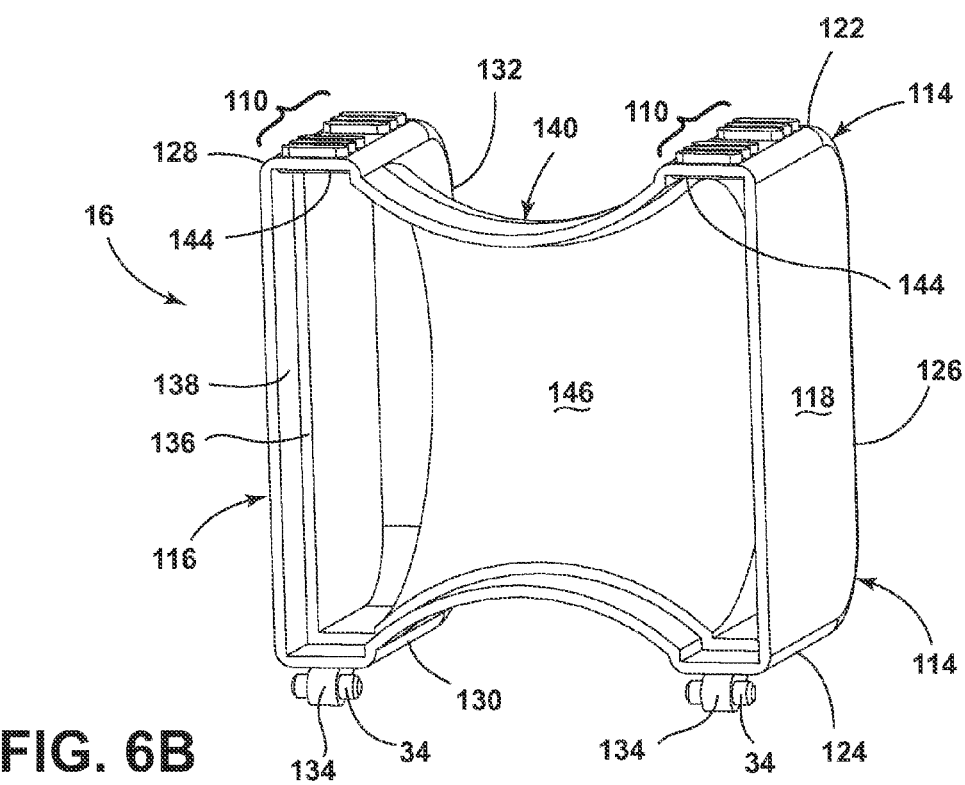
FIG. 6B is a second perspective view of the pivotable closure illustrated in FIG. 6A.

As illustrated in FIGS. 6A and 6B, the closure 16 may be a bilaterally symmetrical hollow body characterized by a closure first sidewall structure 114, an opposed closure second sidewall structure 116, and an intervening closure saddle 140 having a closure saddle surface 142 generally configured as a hyperbolic paraboloid. A pair of opposed curved closure saddle transition lines 66 may define the intersection of the closure saddle surface 142 with the closure sidewall structures 114, 116. The first sidewall structure 114 may comprise a sidewall characterized by a generally planar closure first sidewall surface 118, transitioning orthogonally to closure first obverse wall 122, a closure first reverse wall 124, and a closure first top wall 126 extending perimetrically along three edges of the closure first sidewall surface 118.

The second sidewall structure 116 may comprise a sidewall characterized by a generally planar closure second sidewall surface 120, transitioning orthogonally to a closure second obverse wall 128, a closure second reverse wall 130, and a closure second top wall 132 extending perimetrically along three edges of the closure second sidewall surface 120. The closure first sidewall surface 118 and closure second sidewall surface 120 may be disposed in a parallel orientation. The first sidewall structure 114, second sidewall structure 116, and closure saddle 140 may define a closure interior 146.

The closure sidewall structures 114, 116, and closure saddle 140 may transition inwardly to a closure perimetric edge 148 that may define a plane perpendicular to the longitudinal axis 13. A closure perimetric skirt 138 may extend orthogonally away from the closure perimetric edge 148, terminating in a closure perimetric shoulder 136 also defining a plane perpendicular to the longitudinal axis 13. Between the closure perimetric edge 148 and the closure top walls 126, 132 a pair of closure grips 110 may extend along and generally orthogonally away from the obverse walls 122, 128. The closure grips 110 are illustrated as each comprising a pair of generally crenelated pads to facilitate interaction between a thumb or finger and the closure grips 110. Alternative configurations, such as toothed, crosshatched, and the like, may be utilized. Adjacent the closure perimetric edge 148, a pair of latch detents 144 may extend inwardly from an interior side of the obverse walls 122, 128 somewhat opposite the closure grips 110. The latch detents 144 are illustrated as semicircular protrusions, each adapted for frictional and mechanical communication with a closure catch 104.

The closure 16 may engage the lure receptacle 114 so that the interior space 38 and closure interior 146 define a continuous space. Referring again to FIGS. 2A, 4, 6A, and 6B, the closure reverse walls 124, 130 may each terminate adjacent the closure perimetric edge 148 in a closure pin bearing 134 comprising part of the hinge 32. A suitable hinge pin 34 may be seated through openings in the closure pin bearings 134 and the lure receptacle pillow blocks 36 to enable pivoting of the closure 16 relative to the lure receptacle 14.

The closure 16 may be rotated about the hinge pins 34 to engage the lure receptacle 14. When the closure 16 may be fully rotated into engagement, as illustrated in FIG. 2A, the receptacle perimetric edge 108 may be brought into close proximity to, or contact with, the closure perimetric shoulder 136. Concurrently, the closure perimetric edge 148 may be brought into close proximity to, or contact with, the receptacle perimetric shoulder 100, and the receptacle perimetric wall 102 and closure perimetric skirt 138 may be in parallel juxtaposition. Each closure latch detent 144 may be seated in a closure catch 104 to retain the closure 16 over the chamber opening 39. The first sidewall surface 42 and closure first sidewall surface 118 may define a plane parallel to the longitudinal axis 13. The second sidewall surface 56 and closure second sidewall surface 120 may define a plane parallel to the longitudinal axis 13 and to the first sidewall surfaces 42, 118. It may be noted that each embodiment described herein may have a pair of interior space sidewall surfaces and closure sidewall surfaces that each define parallel planes when the closures are rotated over the chamber openings.

With the closure 16 fully engaged over the chamber opening 39, a closed planar curve having a minimal length may be defined by the bilaterally symmetrical intersection of the channel obverse wall 24, the channel reverse wall 26, the receptacle saddle surface 29, and the closure saddle surface 142 by a plane containing the longitudinal axis 13. Such plane may be parallel to the receptacle sidewall surfaces 42, 56 and closure sidewall surfaces 118, 120. It may be readily understood that a leader may tend to overlie such closed planar curve as the leader is wrapped around the modular fishing lure container 12. This may minimize the likelihood that the leader may loosen and unravel from the fishing lure container 12. The leader may also be retained around the modular fishing lure container 12 by the extension of the closure sidewall structures 18, 20, 114, 116 beyond the closed planar curve.

Figure 7B:
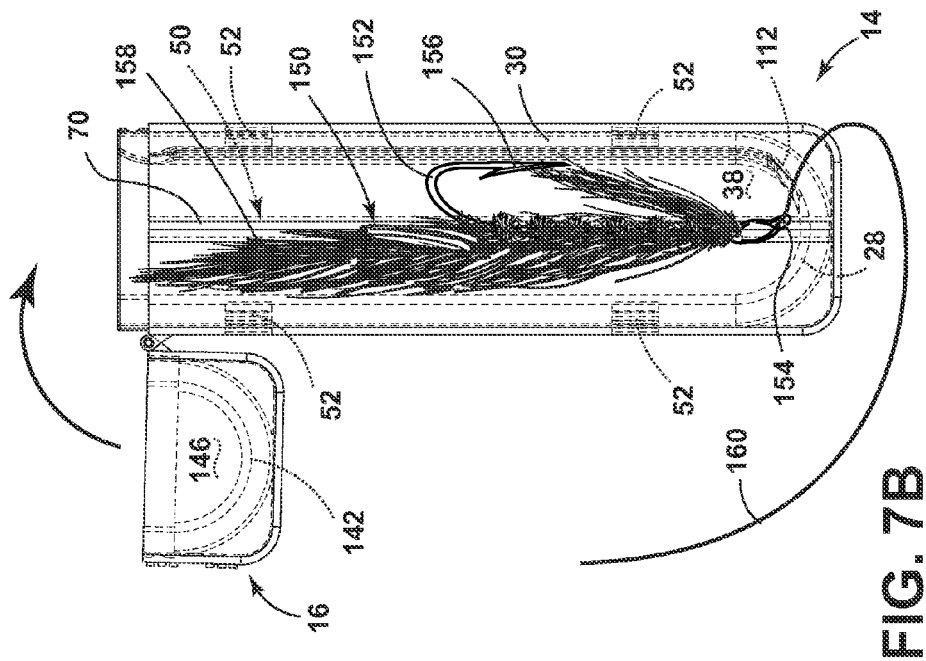
FIGS. 7A-7D are vertical side views of the modular fishing lure organization and storage container of FIG. 2A, a fishing lure, and an attached leader in various stages of storage.
Figure 7A:
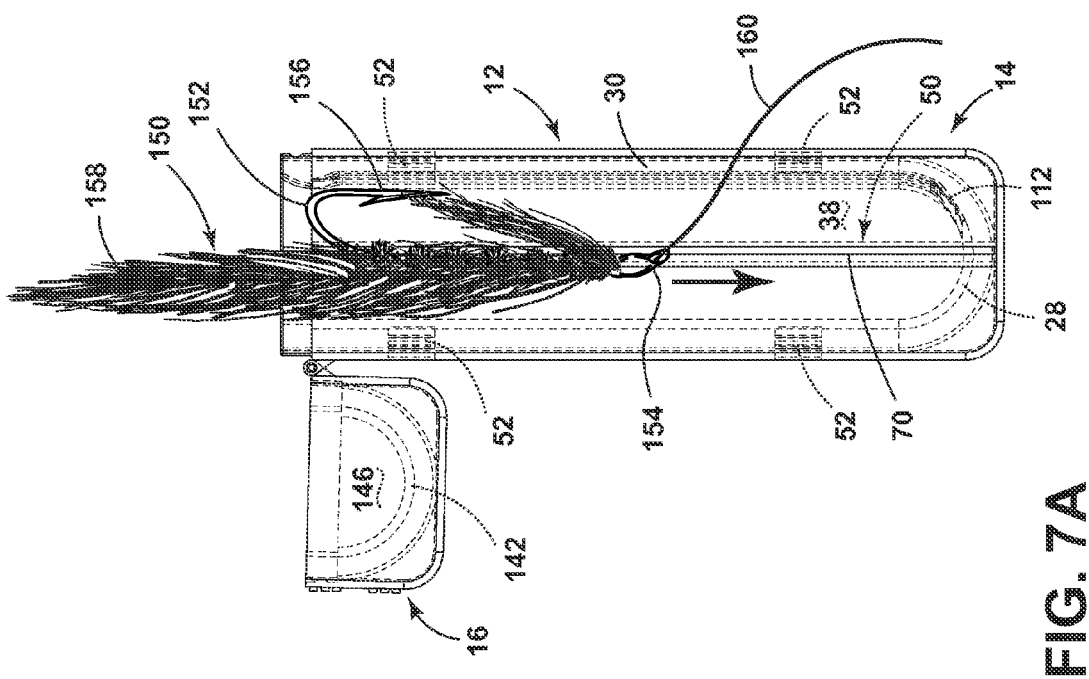
Figure 7C:
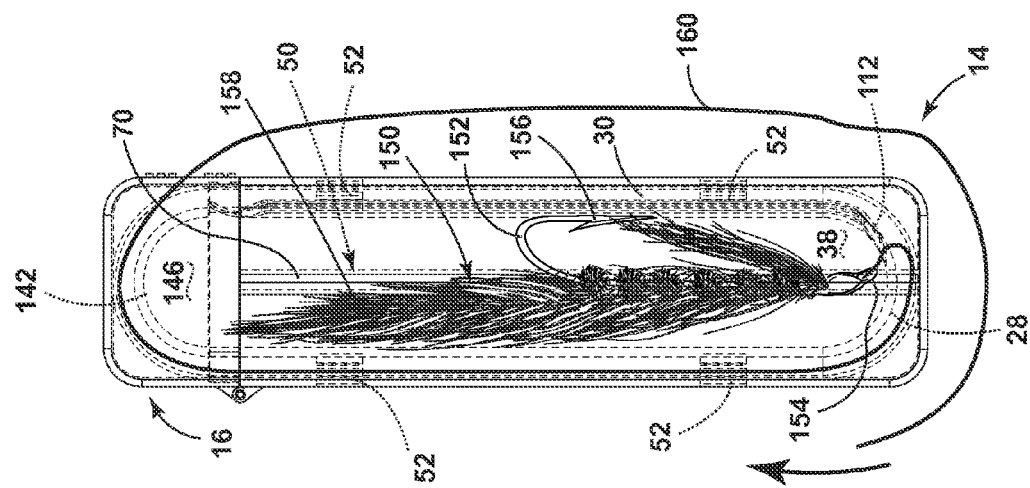
Figure 7D:
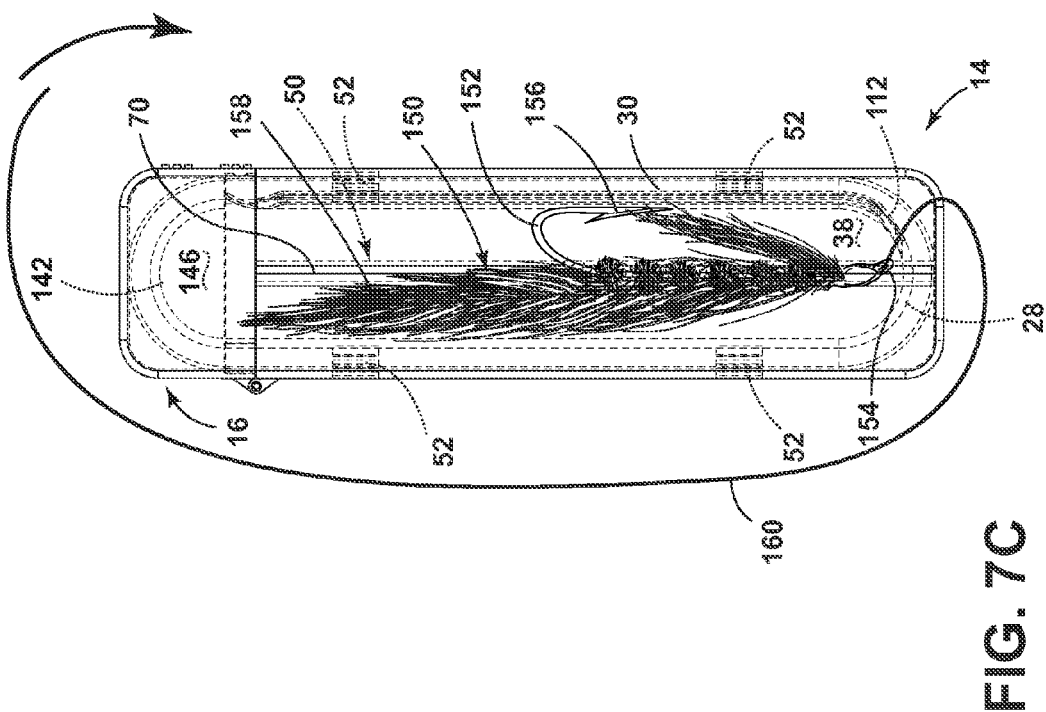

Turning now to FIGS. 7A-7D, placement of a fishing lure in a modular fishing lure container 12 is illustrated. FIG. 7A illustrates a fishing fly 150 comprising a generally known hook 152 having an eye 154 to which a fishing leader 160 may be attached, and a barb 156. A body 158 may be attached to the hook 152, which may consist of yarn, fabric, feathers, animal hair and/or fur, thread, and the like, that may be combined to represent an authentic aquatic food source.

The fly 150 may be stored in the modular fishing lure container 12 by initially inserting the eye 154 and fishing leader 160 through the chamber opening 39 into the interior space 38. The leader 160 may be oriented to extend through the leader slot 30 directly from the eye 154. As the eye 154 may approach the receptacle saddle 28, the leader 160 may be run along the leader slot 30 until the fly 150 is completely received in the interior space 38 (FIG. 7B). At this step, the leader 160 may extend through the slot tail 112.

The closure 16 may be rotated over the chamber opening 39 to engage the latch detent 144 in the closure catch 104, thereby closing the modular fishing lure container 12 for protecting the fly 150 therein. The portion of the leader 160 extending beyond the leader slot 30 may be wrapped around the modular fishing lure container 12 (FIG. 7C) by running the leader 160 along the leader channel 22 toward the closure 16, i.e. along the channel obverse wall 24, over the closure saddle 140, along the channel reverse wall 26, and over the receptacle saddle 28, repeating the steps (FIG. 7D) until the leader 160 may be completely wrapped around the modular fishing lure container 12. The offset of the leader slot 30 from the longitudinal centerline of the channel obverse wall 24 toward the second sidewall structure 20 may prevent unintended insertion of the leader 160 into the slot 30 during wrapping of the leader 160 around the the modular fishing lure container 12.

The free end of the leader 160 may then be secured to the channel obverse wall 24 or channel reverse wall 26 by inserting the leader 160 beneath a hold-down finger 53 to a position between the flexible leader hold-down 52 and the hold-down slot 64. The leader 160 may consequently be "pinched" between the leader hold-down 52 and the hold-down slot 64, thereby preventing the leader 160 from unwinding. The number and spacing of leader hold-downs 52 may enable securing of the leader 160 to the modular fishing lure container 12, while minimizing any unsecured length of leader 160.

It may be noted that wrapping of the leader 160 around the modular fishing lure container 12 may provide a further means of preventing unintentional opening of the closure 16. It may also be noted that the modular fishing lure container 12 may be utilized for storage of fishing lures other than flies, including lures without attached leaders.

Modular fishing lure containers may be provided in a plurality of dimensions prescribed by the various sizes of lures that may be utilized. This may ensure that each lure is stored in a container that minimizes movement of the lure therein as well as damage resulting from movement.

Figure 8:
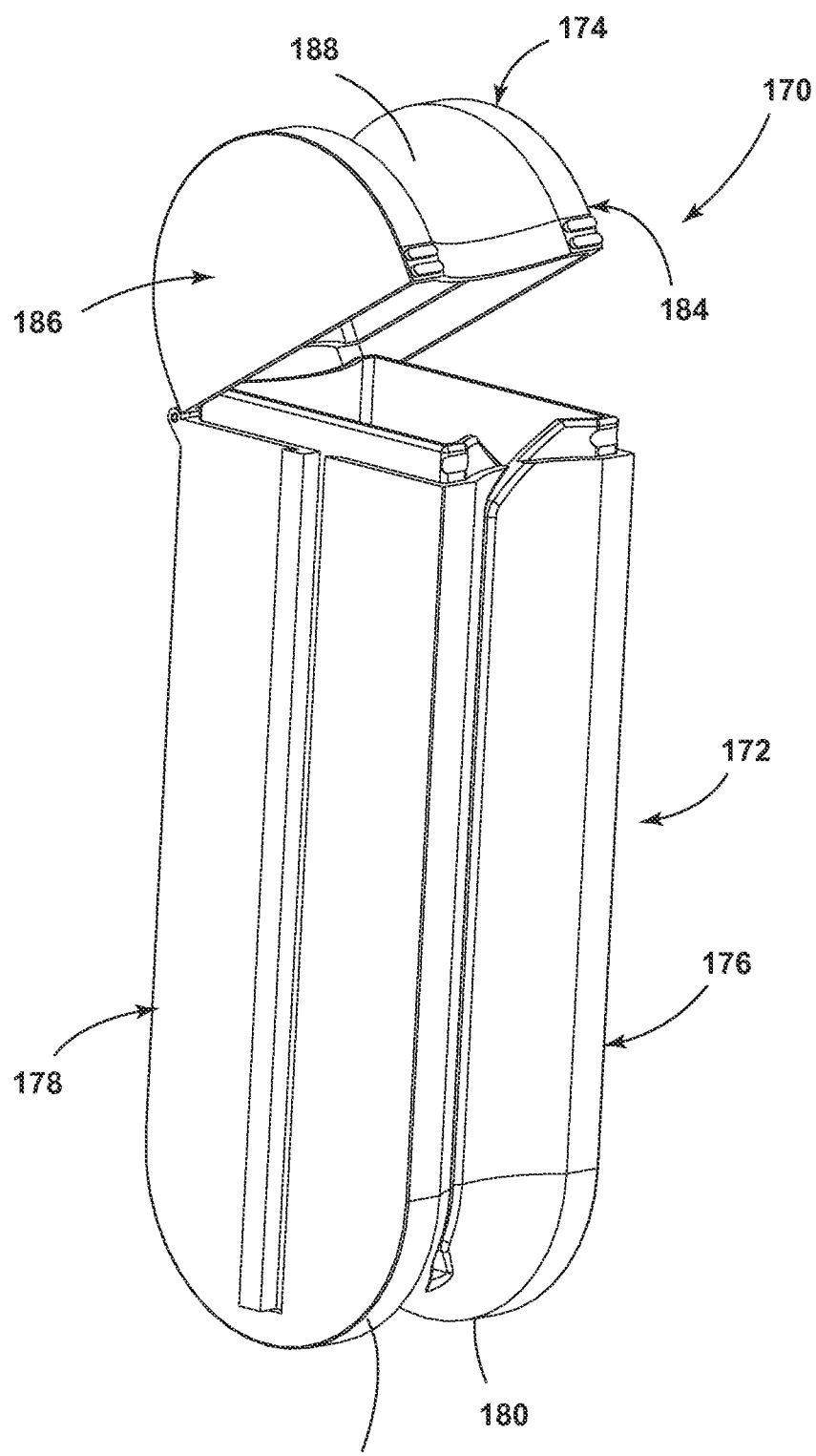
FIG. 8 is a perspective view of a modular fishing lure organization and storage container with a pivotable closure and lure receptacle according to a third embodiment of the invention.

Turning now to FIG. 8, a modular fishing lure container 170 according to an alternate embodiment of the invention is illustrated comprising a lure receptacle 172 and a closure 174 and including the first exemplary embodiment of a container coupler 50. The lure receptacle 172 may share many features of the lure receptacle 14, except that the first sidewall structure 176 and second sidewall structure 178 may be characterized by rounded shoulders 180, 182, respectively, rather than the rectangular shoulders of the lure receptacle 14. Thus, the sidewall structures 176, 178 may comprise a pair of spaced parallel generally U-shaped walls, each U-shaped wall comprising an obverse face 166 and a reverse face 168.

The closure 174 may share most features of the closure 16, except that the closure first sidewall structure 184 and closure second sidewall structure 186 may be characterized by rounded shoulders 162, 164, respectively, similar to the rounded shoulders 180, 182. The closure 174 may comprise a closure saddle 188 similar to the closure saddle 140.

The lure receptacle 172 is illustrated as comprising the first container coupler embodiment 50 for coupling a plurality of lure receptacles 172 together, as hereinbefore described. A fishing lure may be stored in the modular fishing lure container 170, followed by wrapping of a leader around the container 170, generally as described with respect to the modular fishing lure container 12.

Figure 9A:
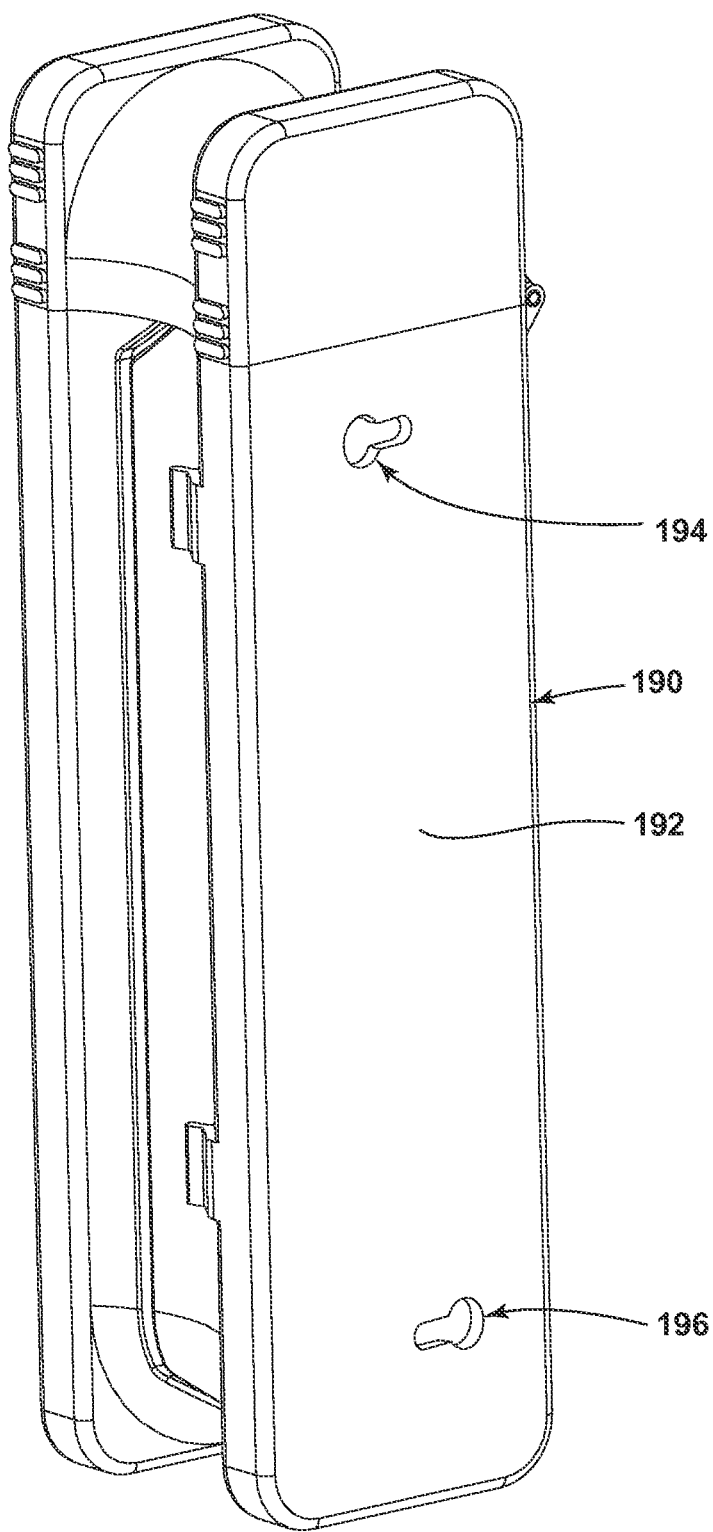
FIGS. 9A and 9B are perspective views of a modular fishing lure organization and storage container with a pivotable closure and lure receptacle according to a fourth embodiment of the invention.
Figure 9B:
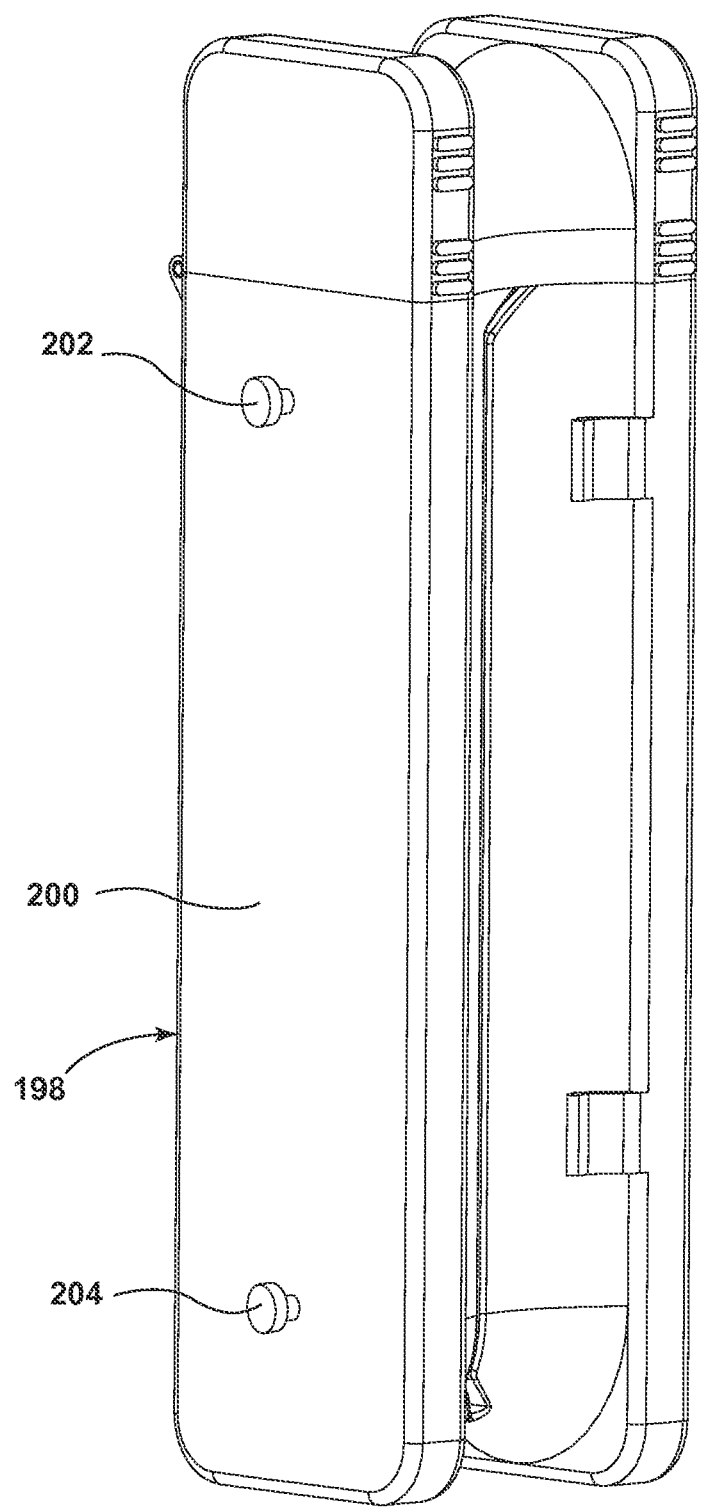

FIGS. 9A and 9B illustrate a modular fishing lure container 222 according to a third embodiment of the invention that may be identical to the first embodiment modular fishing lure container 12 except for a second container coupler embodiment 191. The second container coupler embodiment 191 may comprise complementary keyhole openings and flanged pins, as hereinafter described.

The modular fishing lure container 222 may comprise a lure receptacle 224 and a closure 16 pivotably coupled thereto. The lure receptacle 224 may comprise a first sidewall structure 190 characterized by a planar first sidewall surface 192 bisected by a first sidewall surface centerline 268, and a parallel spaced second sidewall structure 198 characterized by a planar second sidewall surface 200. The first sidewall surface 192 may be penetrated by an upper keyhole opening 194 adjacent the chamber opening 39 comprising an upper keyhole opening slot 260 transitioning to an upper keyhole circular opening 262, and a lower keyhole opening 196 adjacent the first and second bottom walls 48, 62 comprising a lower keyhole opening slot 264 transitioning to a lower keyhole circular opening 266. The keyhole openings 194, 196 may be oriented in horizontally opposed directions with the keyhole opening slots 260, 264 aligned along the first sidewall surface centerline 268.

A counterpart upper flanged pin 202 and a counterpart lower flanged pin 204 may be attached to and extend orthogonally away from the second sidewall surface 200. The upper flanged pin 202 may be characterized by a cylindrical upper pin shaft 270 attached at one end to the second sidewall surface 200 and transitioning to circular plate-like upper pin flange 272 spaced from and parallel to the sidewall surface 200. The lower flanged pin 204 may be characterized by a cylindrical lower pin shaft 274 attached at one end to the second sidewall surface 200 and transitioning to a circular plate-like lower pin flange 276 spaced from and parallel to the sidewall surface 200. The circular pin flanges 272, 276 may be characterized by a diameter somewhat smaller than the diameter of the keyhole circular openings 262, 266 to enable slidable insertion of the flanges 272, 276 into the circular openings 262, 266. Similarly, the cylindrical pin shafts 270, 274 may be characterized by a diameter somewhat smaller than the width of the keyhole opening slots 260, 264 to enable slidable translation of the pin shafts 270, 274 along the slots 260, 264.

The upper flanged pin 202 and lower flanged pin 204 may be vertically aligned along a centerline of the second sidewall surface 200 (not shown) in spaced disposition for receipt of the counterpart pin shafts 270, 274 in the keyhole opening slots 260, 264. A pair of modular fishing lure containers 222 may be coupled together by aligning the flanges 272, 276 of the upper and lower flanged pins 202, 204, respectively, with the counterpart upper and lower keyhole circular openings 262, 266 of the upper and lower keyhole openings 194, 196, respectively. The flanges 272, 276 may be inserted through the keyhole circular openings 262, 266 to clear the first sidewall structure 190. The modular fishing lure containers 222 may be rotated relative to each other to seat the pin shafts 270, 274 in the keyhole opening slots 260, 264, respectively. The flanges 272, 276 may be disposed along the inside surface of the first sidewall structure 190 behind the keyhole opening slots 260, 264, and may prevent separation of the modular fishing lure containers 222 by the large diameter of the flanges 272, 276 relative to the width of the keyhole opening slots 260, 264.

The upper and lower pin shafts 270, 274 may be configured for frictional engagement with the keyhole opening slots 260, 264 to maintain a selected alignment of the coupled fishing lure containers 222. Additionally, the length of the pin shafts 270, 274 may be configured relative to the thickness of the first sidewall structure 190 so that the pin shafts 270, 274 may be placed in tension when the flanges 272, 276 are positioned behind the slots 260, 264. This may facilitate development of frictional forces between the flanges 272, 276 and the interior surface of the first sidewall structure 190, further maintaining a selected alignment of the coupled fishing lure containers 222.

Figure 10A:
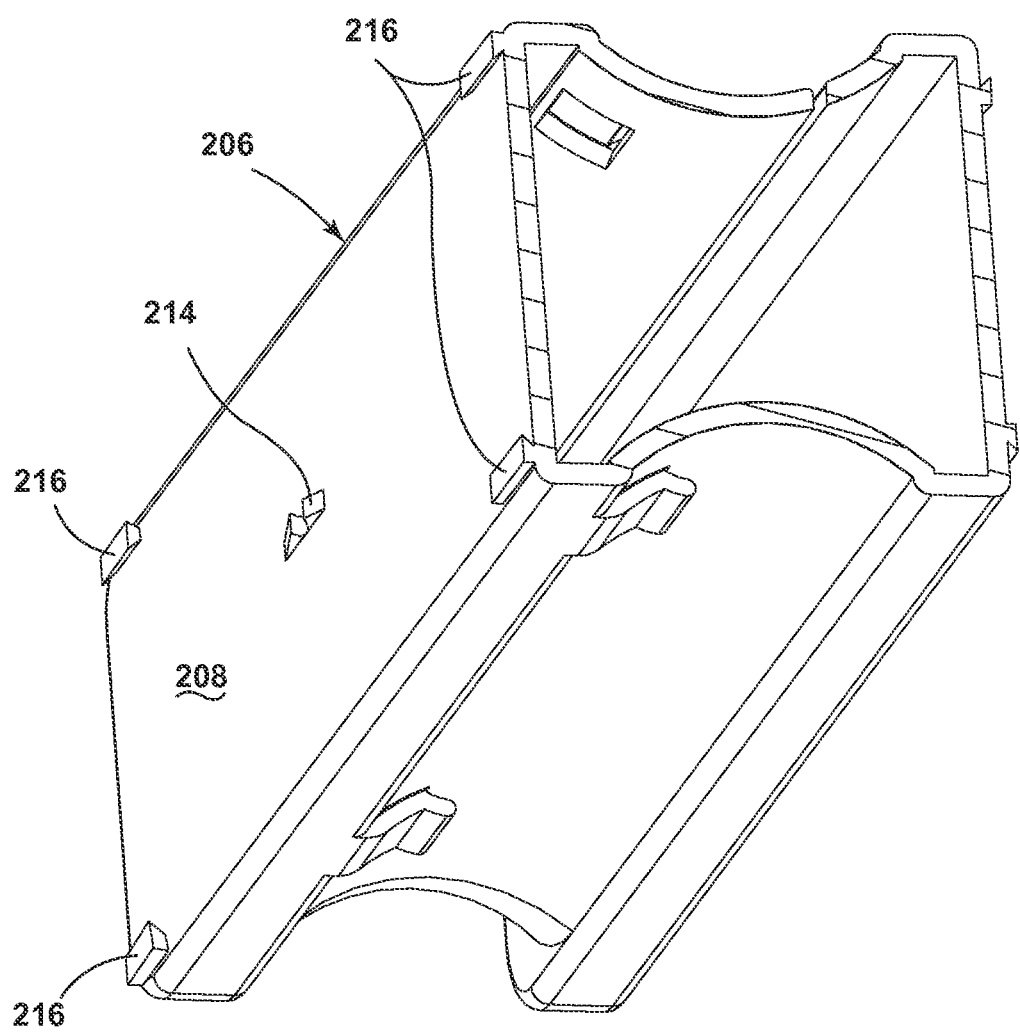
FIGS. 10A and 10B are perspective section views of a modular fishing lure organization and storage container with a pivotable closure and lure receptacle according to a fifth embodiment of the invention.
Figure 10B:
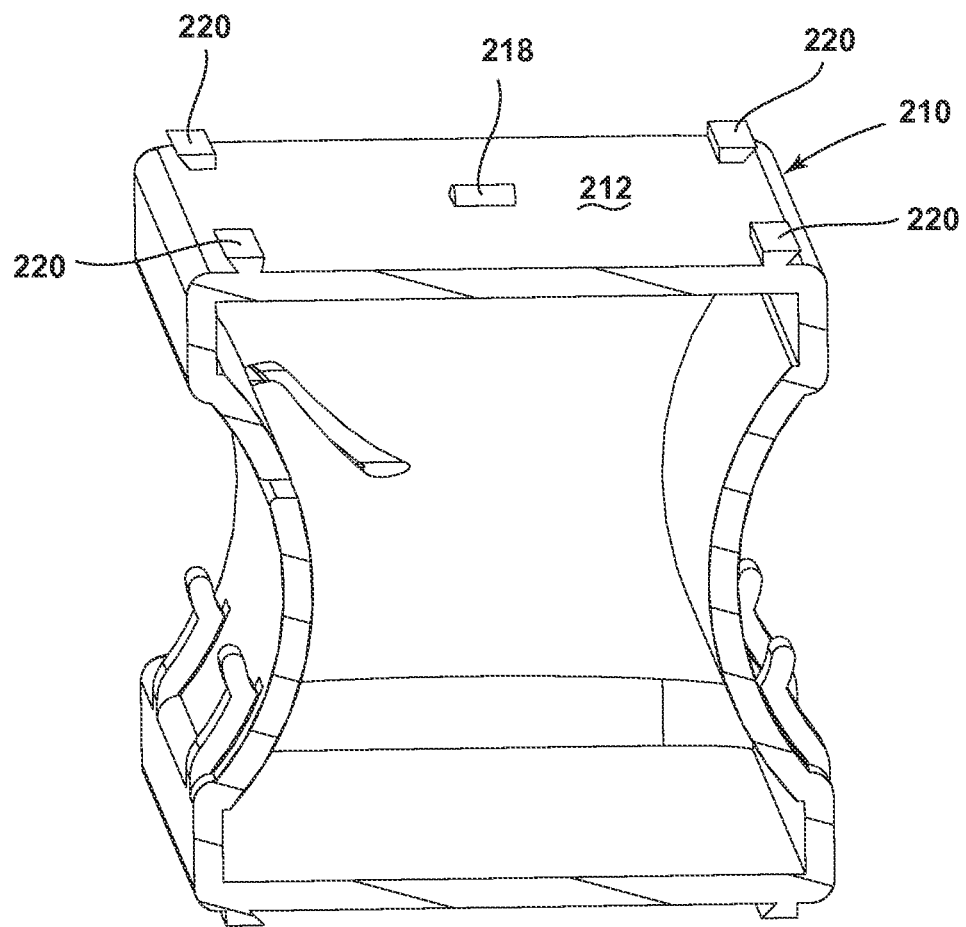
Figure 11:
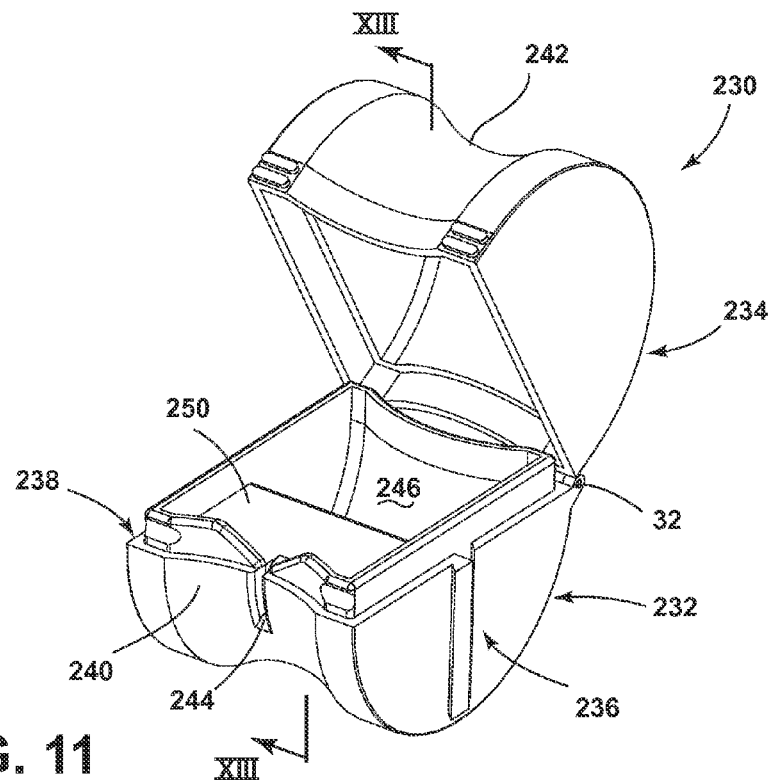
FIG. 11 is a first perspective view of a modular fishing lure organization and storage container with a pivotable closure and lure receptacle according to a sixth embodiment of the invention.

FIGS. 10A and 10B illustrate a lure receptacle 284 comprising part of a modular fishing lure container according to a fourth embodiment of the invention, that may be identical to the first embodiment modular fishing lure receptacle 14 except for a third container coupler embodiment 207. The lure receptacle 284 may comprise a first sidewall structure 206 characterized by a planar first sidewall surface 208, and a parallel spaced second sidewall structure 210 characterized by a planar second sidewall surface 212. Each corner of the first sidewall surface 208 may include a facing corner catch 216. Each corner catch 216 may be a trapezoidal prism and may comprise a planar corner catch outer wall 286 extending orthogonally away from the first sidewall surface 208, a planar corner catch top wall 288 extending from the outer wall 286 parallel to the first sidewall surface 208, and a planar corner catch inclined wall 290 slanting acutely inwardly from the top wall 288 to the first sidewall surface 208. The inclined walls 290 may have an inwardly facing orientation.

A cradle 214 may extend away from the first sidewall surface 208 at the diagonal intersection defined by the four corner catches 216, and may comprise a pair of symmetrically disposed wedge-shaped protrusions each characterized by an inclined face 292 and joined at a curved saddle notch 294.

The second sidewall surface 212 may include four opposing corner catches 220 each configured as a counterpart trapezoidal prism identical to the facing corner catches 216 and comprising a planar corner catch inner wall 296 extending orthogonally away from the second sidewall surface 212, a planar corner catch top wall 298 extending from the inner wall 296 parallel to the second sidewall surface 212, and a planar corner catch inclined wall 300 slanting acutely inwardly from the top wall 298 to the second sidewall surface 212. The inclined walls 300 may have an outwardly facing orientation.

A semi-cylindrical detent 218 may extend away from the second sidewall surface 212 at a diagonal intersection defined by the four corner catches 220. The detent 218 may be oriented with a longitudinal axis (not shown) parallel to the second sidewall surface 212 and orthogonal to the longitudinal axis 13.

The facing corner catches 216 may be attached to the first sidewall surface 208, and the counterpart opposing corner catches 220 may be attached to the second sidewall surface 212, so that each facing corner catch 216 of a first lure receptacle 284 may slidably engage a counterpart corner catch 220 of a second lure receptacle 284. The modular fishing lure receptacles 284 may be coupled together by aligning the facing corner catches 216 with the counterpart corner catches 220, and slidably translating one receptacle 284 relative to the other to juxtapose the inclined faces 290, 300. As the lure receptacles 284 may move longitudinally relative to each other, the detent 218 may slidably move along an inclined face 292 of the cradle 214 until the detent 218 is disposed in the counterpart saddle notch 294, thereby locking the fishing lure containers 284 together. The detent 218 and cradle 214 may be configured so that when the detent 218 is received in the saddle notch 294, the juxtaposed corner catches 216, 220 may be in tension with the inclined faces 290, 300 in frictional engagement, thereby maintaining the relative disposition of the modular fishing lure containers. Coupled modular fishing lure receptacles 284 may be separated by applying opposed longitudinal forces to the receptacles 284 sufficient to move the detent 218 out of the cradle 214.

FIGS. 11-14 illustrate a modular small lure container 230 according to a fifth embodiment of the invention. As with the preceding embodiments, although the modular small lure container 230 may be utilized for storage of a variety of lures, it may be anticipated that the modular small lure container 230 will be frequently utilized for storage of small fishing flies. The small lure container 230 is illustrated having a container coupler embodiment identical in pertinent respects to the first container coupler embodiment 50. The modular fishing lure container 230 may comprise a lure receptacle 232 and a closure 234, each having a semicircular profile, pivotably coupled together through a pair of hinges 32. The lure receptacle 232 may comprise a first sidewall structure 236 and a second parallel spaced sidewall structure 238, each characterized by a planar sidewall surface. A receptacle saddle 240 may define a surface generally configured as a hyperbolic paraboloid, similar to the second embodiment receptacle saddle, extending between the receptacle sidewall structures 236, 238. The receptacle saddle 240 may be partially bisected by a leader slot 244 having a configuration and purpose similar to the configuration and purpose of the leader slot 30. The sidewall structures 236, 238 and receptacle saddle 240 may define an interior space 246, which may comprise a lure chamber.

The closure 234 may comprise a first closure sidewall structure 254 and a parallel spaced second closure sidewall structure 256, each characterized by a planar sidewall surface. A closure saddle 242 may define a surface generally configured as a hyperbolic paraboloid similar to the first embodiment receptacle saddle 28, extending between the closure sidewall structures 254, 256. When the closure 234 is rotated to close the interior space 246, the sidewall structures 236/254, 238/256 may define a pair of parallel spaced circular plate-like structures. The structures may be joined by a somewhat hourglass-shaped portion defined by the receptacle saddle 240 and closure saddle 242.

Figure 13:
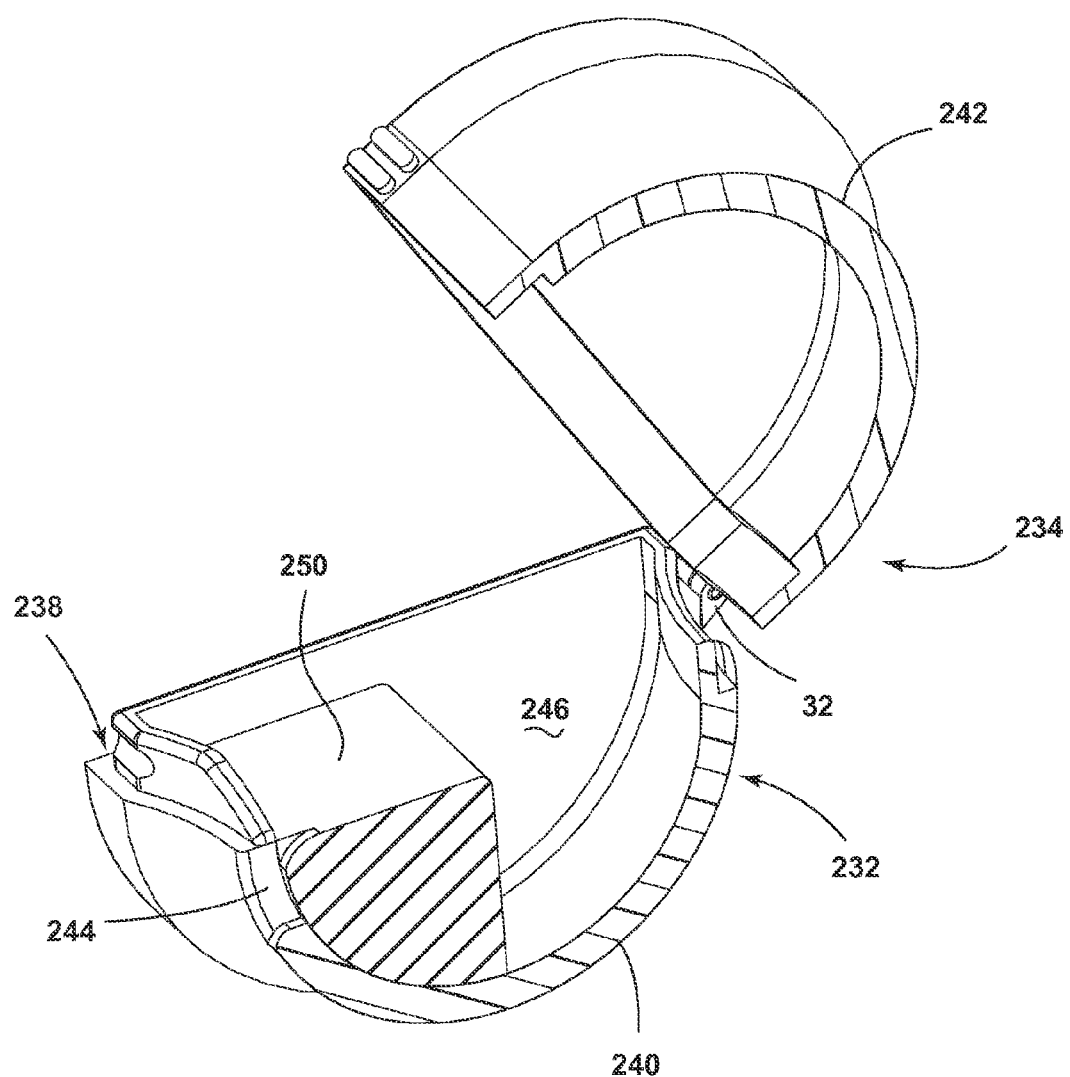
FIG. 13 is a perspective section view along view line 13-13 of FIG. 11.

The interior space 246 may be provided with a resilient insert 250, e.g. a foam piece, having a cross-sectional configuration complementary with the interior profile of the lure receptacle saddle 240. As illustrated in FIG. 13, the resilient insert 250 may have a quadrant configuration so that a fly may be selectively attached to a top surface or a vertical surface of the insert 250. A leader may be threaded from the interior space 246 through the leader slot 244, and wrapped around the receptacle saddle 240 and closure saddle 242, generally in accordance with the hereinbefore described method.

Figure 12:
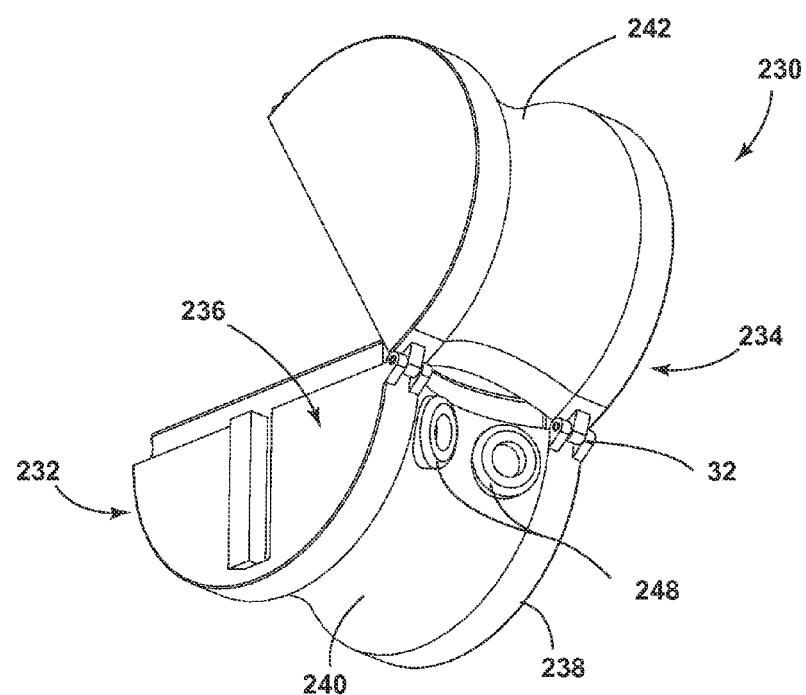
FIG. 12 is a second perspective view of the modular fishing lure organization and storage container illustrated in FIG. 11.

As illustrated in FIG. 12, a pair of symmetrically-spaced leader hold-downs 247 may be attached to the receptacle saddle 240 adjacent the hinges 32. Each hold-down 247 may comprise a leader peg 248 extending from the receptacle saddle 240 having a cylindrical configuration. The leader peg 248 may be circumscribed by a leader tie off 249 attached to the leader peg 248 in contact with the receptacle saddle 240. In one embodiment, the leader tie off 249 may comprise an elastic device, e.g. a rubber O-ring, or a circular foam or plastic washer, or a resilient cap (not shown), circumscribing, and/or seated over, the leader peg 248. The leader tie off 249 may have a suitable resiliency that it may be compressed somewhat against the receptacle saddle 240 when attached to the leader peg 248. A leader end may be inserted between the receptacle saddle 240 and the leader tie off 249 so that a leader end may be wrapped around the leader peg 248 and held against the receptacle saddle 240.

Figure 14:
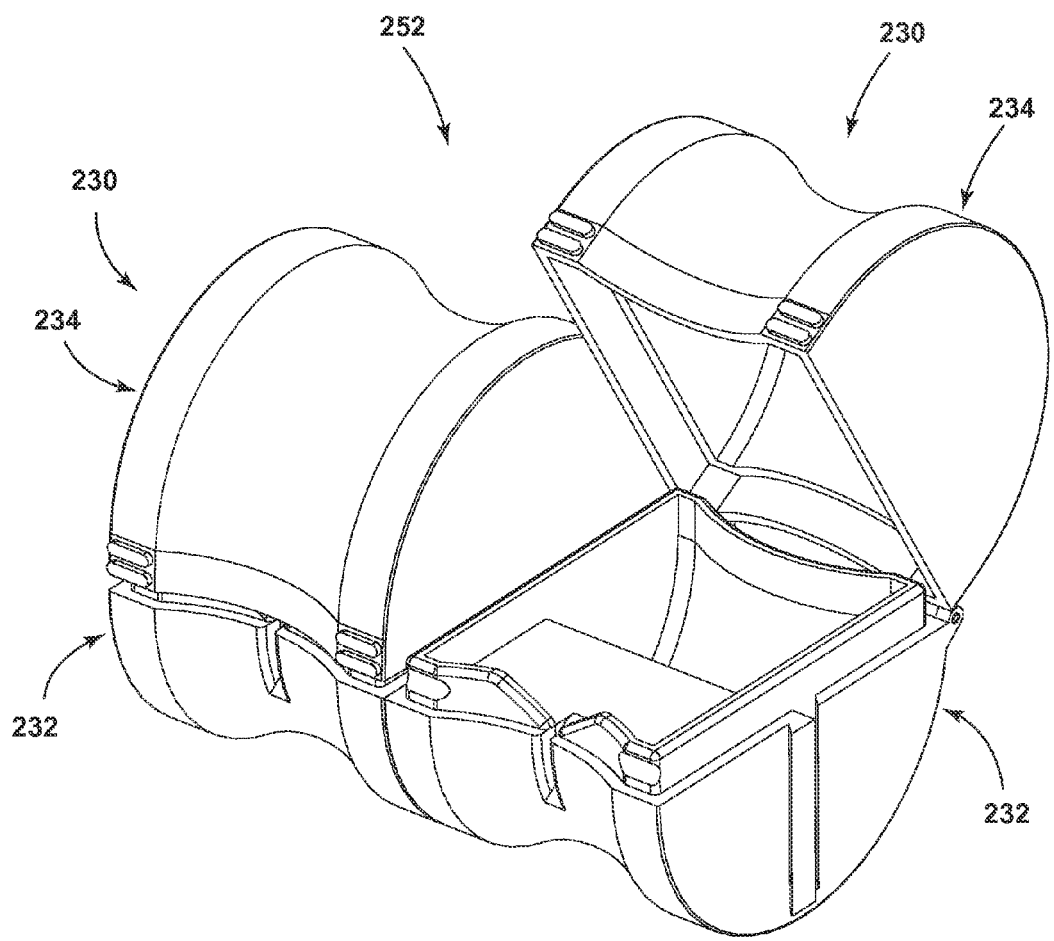
FIG. 14 is a perspective view of a pair of the interconnected modular fishing lure organization and storage containers illustrated in FIG. 11.

As illustrated in FIG. 14, a pair of modular small lure containers 230 may be coupled together through mutual interlocking of the mating portions of the first container coupler embodiment 50 associated with each container to form a modular small fishing lure organization and storage container system 252. A selected plurality of containers 230, e.g. 4, 5, 8, etc., may be coupled together into a container system 252. The containers 230 may alternatively be coupled together using another of the container coupler embodiments described and illustrated herein. Each container 230 may also be utilized singly.

In yet another embodiment of the invention, a plurality of fishing lure containers, e.g. the modular fishing lure containers 12, may be fixedly joined together into a modular fishing lure organization and storage container system, e.g. as a single line of fishing lure containers, generally as illustrated in FIG. 1. As previously described herein, each container 12 may include a container coupler for selective assembly of a modular modular fishing lure container system comprising multiple containers 12. Alternatively, the containers may be coupled together during fabrication so that each pair of containers may share a common sidewall. The fishing lure container system may thus comprise a pre-selected number of containers, e.g. 4, 6, 8, etc.

The ability to have similar lures stored in proximity to one another aids in speedy identification and thus, their retrieval.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A modular fishing lure organization and storage container for a fishing lure attached to a leader, the container comprising:
   a receptacle characterized by a chamber and a chamber opening, comprising
      a pair of parallel spaced-apart planar sidewalls;
      a pair of parallel spaced-apart outwardly concave channel walls connecting the planar sidewalls; and
      a receptacle saddle connecting the sidewalls and the channel walls;
   a closure closeable over the chamber opening; and
   a slot dividing one of the concave channel walls, and extending from the chamber opening into the receptacle saddle;
   whereby a fishing lure may be placed in the receptacle;
   whereby a leader attached to a fishing lure may be inserted through the slot;
   whereby the closure may be closed over the chamber opening; and
   whereby the leader may be wrapped along the concave channel walls and over the receptacle saddle and the closure to minimize the likelihood of damage to the fishing lure.

2. A modular fishing lure organization and storage container according to claim 1 wherein the storage container is bilaterally symmetrical.

3. A modular fishing lure organization and storage container according to claim 2 wherein the storage container is characterized by a longitudinal axis and is bilaterally symmetrical about the longitudinal axis.

4. A modular fishing lure organization and storage container according to claim 3 wherein the storage container is characterized by a plane parallel to and equidistant from the planar sidewalls.

5. A modular fishing lure organization and storage container according to claim 4 wherein the longitudinal axis intersects the plane.

6. A modular fishing lure organization and storage container according to claim 4 wherein the intersection of the plane with the storage container defines a closed planar curve along which a leader is wrappable.

7. A modular fishing lure organization and storage container according to claim 4 wherein the slot lies entirely to one side of the plane.

8. A modular fishing lure organization and storage container according to claim 1 wherein the closure is pivotably coupled with the receptacle.

9. A modular fishing lure organization and storage container according to claim 1, and further comprising a leader hold-down for holding an end of a leader.

10. A modular fishing lure organization and storage container according to claim 9 wherein the leader hold-down is an angled cantilevered flat spring terminating in a hold-down finger, or a cylindrical peg circumscribed by a resilient tie off.

11. A modular fishing lure organization and storage container according to claim 1 wherein an inadvertent opening of the closure is preventable when a leader is wrapped around the storage container.

12. A modular fishing lure organization and storage container according to claim 1 wherein the receptacle saddle is characterized by a surface defining a hyperbolic paraboloid.

13. A modular fishing lure organization and storage container according to claim 1 wherein the closure is characterized by a closure saddle surface defining a hyperbolic paraboloid.

14. A modular fishing lure organization and storage container system for a plurality of fishing lures attached to leaders, the container system comprising:
   at least one receptacle characterized by a chamber and a chamber opening, the receptacle comprising
      a pair of parallel spaced-apart planar sidewalls, each sidewall comprising a counterpart of a container coupler;
      a pair of parallel spaced-apart outwardly concave channel walls connecting the planar sidewalls; and
      a receptacle saddle connecting the sidewalls and the channel walls;
   a closure closeable over the chamber opening; and
   a slot dividing one of the concave channel walls, and extending from the chamber opening into the receptacle saddle;
   whereby a first receptacle is coupleable with a second receptacle by complementary engagement of a first counterpart of the container coupler associated with the first receptacle with a second counterpart of the container coupler associated with the second receptacle;
   whereby a fishing lure may be placed in the chamber without engaging any other of the plurality of receptacles; and
   whereby a selected plurality of fishing lures may be transported in a selected plurality of coupled receptacles without transporting unused fishing lures or receptacles.

15. A modular fishing lure organization and storage container system according to claim 14 wherein each receptacle is bilaterally symmetrical.

16. A modular fishing lure organization and storage container system according to claim 15 wherein each receptacle is characterized by a plane parallel to and equidistant from the planar sidewalls and bilaterally symmetrical about the plane.

17. A modular fishing lure organization and storage container system according to claim 16 wherein the slot lies entirely to one side of the plane.

18. A modular fishing lure organization and storage container system according to claim 14 wherein the closure is pivotably coupled with the receptacle.

19. A modular fishing lure organization and storage container system according to claim 14, and further comprising a leader hold-down for holding an end of a leader.

20. A modular fishing lure organization and storage container system according to claim 19 wherein the leader hold-down is an angled cantilevered flat spring terminating in a hold-down finger, or a cylindrical peg circumscribed by a resilient tie off.

* * * * *